(12) United States Patent
Miller (10) Patent No.: US 9,970,549 B2
(45) Date of Patent: May 15, 2018

(54) RADIAL COVERAGE PISTON RING GROOVE ARRANGEMENT

(71) Applicant: United Technologies Corporation, Hartford, CT (US)

(72) Inventor: Jonathan Logan Miller, Ware, MA (US)

(73) Assignee: United Technologies Corporation, Farmington, CT (US)

( * ) Notice: Subject to any disclaimer, the term of this patent is extended or adjusted under 35 U.S.C. 154(b) by 548 days.

(21) Appl. No.: 14/600,858

(22) Filed: Jan. 20, 2015

(65) Prior Publication Data

US 2016/0208923 A1  Jul. 21, 2016

(51) Int. Cl.
| | |
|---|---|
| *F16J 15/3208* | (2016.01) |
| *F16J 15/3268* | (2016.01) |
| *F16J 15/3252* | (2016.01) |
| *F01D 11/00* | (2006.01) |
| *F16J 15/44* | (2006.01) |

(52) U.S. Cl.
CPC ......... *F16J 15/3208* (2013.01); *F01D 11/003* (2013.01); *F16J 15/3252* (2013.01); *F16J 15/3268* (2013.01); *F16J 15/441* (2013.01)

(58) Field of Classification Search
CPC ........ F16J 9/20; F16J 9/206; F16J 9/26; F16J 9/24; F16J 9/063; F16J 6/06; F16J 9/14; F16J 15/32; F16J 15/3208
See application file for complete search history.

(56) References Cited

U.S. PATENT DOCUMENTS

| | | | | |
|---|---|---|---|---|
| 1,798,458 | A | * 3/1931 | Deputy ................... | E04H 17/18 277/451 |
| 2,474,132 | A | * 6/1949 | Vernet ...................... | F16J 15/32 277/451 |
| 3,600,048 | A |   8/1971 | Makhobey | |
| 3,656,766 | A | * 4/1972 | Geffroy ...................... | F16J 9/00 277/451 |
| 4,326,724 | A | * 4/1982 | Gernandt ................... | F16J 9/12 277/442 |
| 5,050,892 | A | * 9/1991 | Kawai ...................... | F16J 15/56 277/436 |
| 2006/0239816 | A1 | 10/2006 | Labbe et al. | |
| 2013/0285331 | A1 | 10/2013 | Kostka et al. | |

FOREIGN PATENT DOCUMENTS

EP  0523899  1/1993

OTHER PUBLICATIONS

Extended European Search Report dated Jun. 1, 2016 in European Application No. 16151954.1.

* cited by examiner

*Primary Examiner* — Vishal A Patel
(74) *Attorney, Agent, or Firm* — Snell & Wilmer L.L.P.

(57) ABSTRACT

A main shaft bearing compartment seal system is described herein. The modified ring groove geometry creates two distinct cavities or steps for a piston ring and a wave spring. This concept provides a separate groove cavity for the spring independent of the fool-proofing and clearance cavity. This modified ring groove geometry increases first face coverage and reduces exposure risk for eccentricity of wave spring to piston ring, to avoid potential disengagement and improve function and performance of the seal assembly and engine.

11 Claims, 8 Drawing Sheets

RADIAL COVERAGE PISTON RING GROOVE ARRANGEMENT

FIELD

The present disclosure relates to seals and more particularly to main shaft bearing compartment seals.

BACKGROUND

Figure 1A:
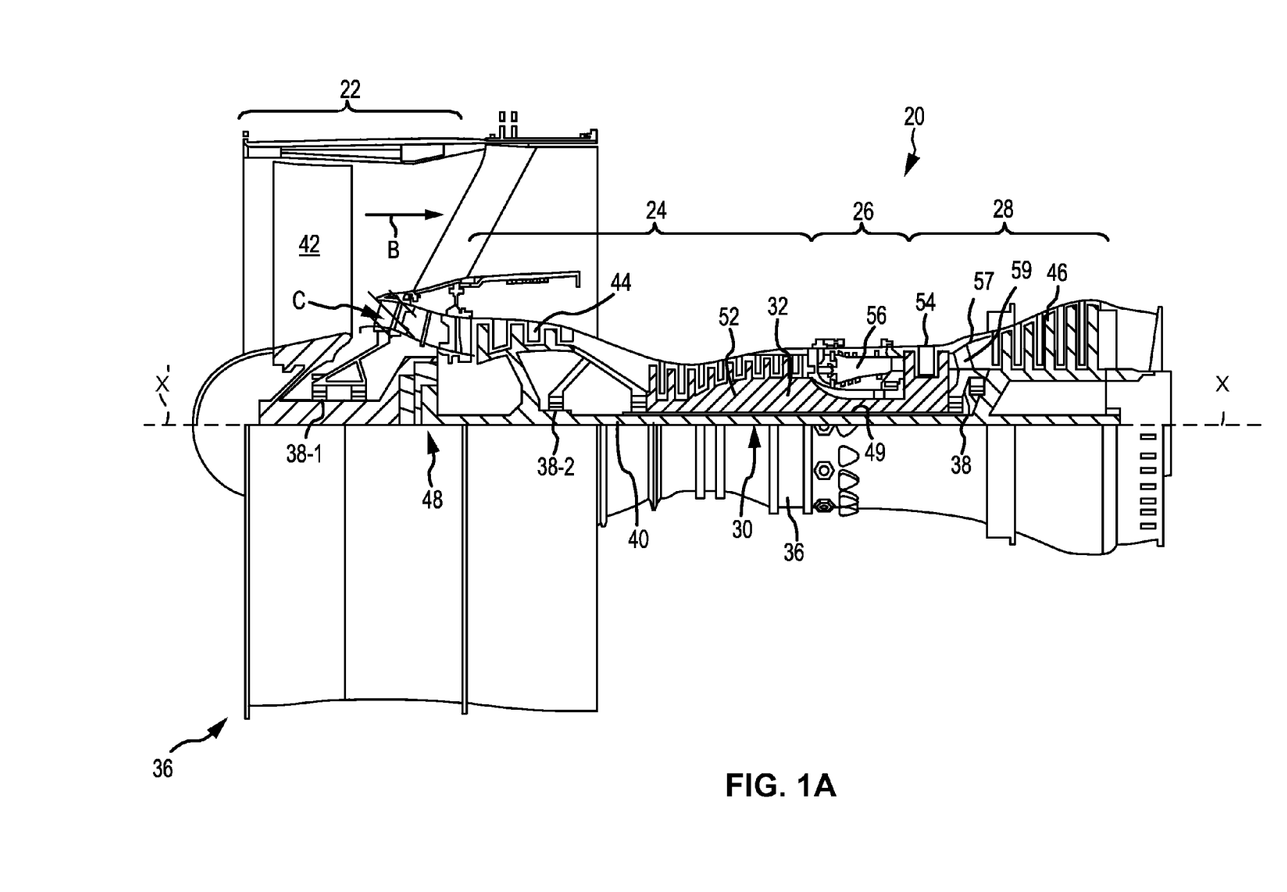
FIG. 1A is a cross-sectional view of a gas turbine engine, in accordance with various embodiments.
Figure 1B:
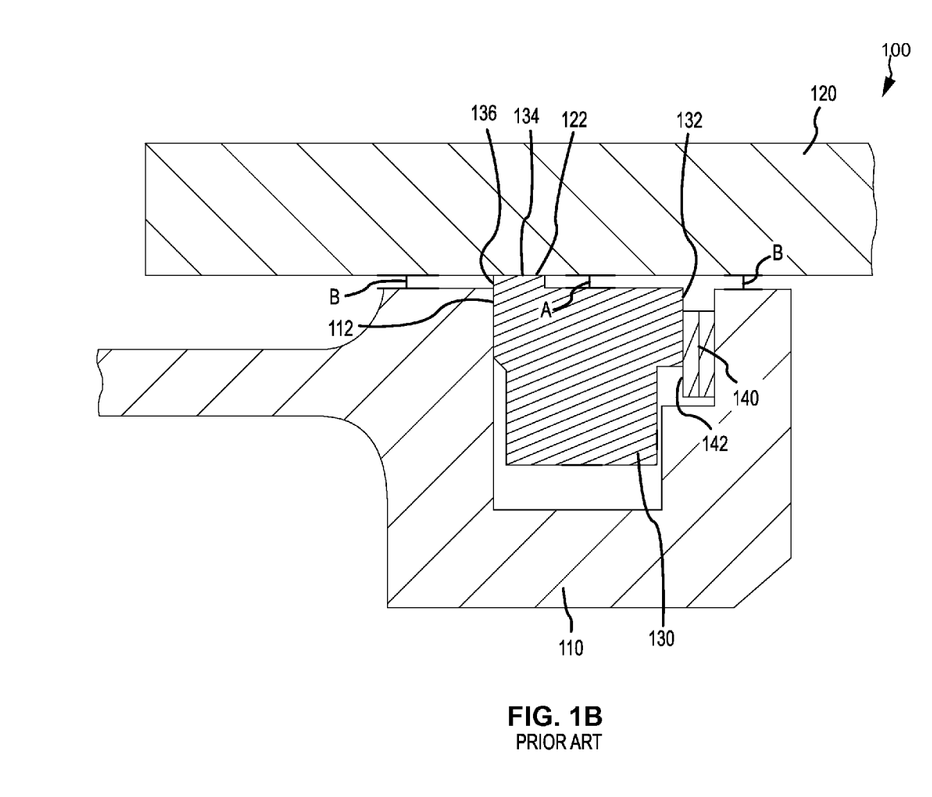
FIG. 1B depicts a conventional main shaft bearing compartment seal system.

A conventional main shaft bearing compartment seal system 100 is depicted in FIG. 1B. Notably, system 100 includes a traditional piston ring and wave spring within a groove assembly. In response to radial eccentricity of each part in the opposite respective radial directions, the radial coverage is low between a piston ring face and a wave spring face. Having low values of face coverage may cause wave spring distortion. This could negatively impact the function and performance of the seal assembly and engine.

SUMMARY

According to various embodiments, a main shaft bearing compartment seal system is described herein. The system may include a cylindrical ID bore. The system may include a carbon seal assembly juxtaposed substantially adjacent to a portion of the cylindrical ID bore. The carbon seal assembly may comprise a first step and a second step. The system may include a piston ring, wherein the piston ring is cylindrical and substantially surrounds the cylindrical ID bore. The system may include a spring configured to interface with a surface of the piston ring. Dimensions of the piston ring may provide physical fool proofing. The spring may be a wave spring. A piston ring face configured to interface with spring face may be longer than the spring face.

A width of the second step may be sized to prevent the spring from entering a gap formed between the piston ring and the carbon seal assembly. According to various embodiments, in response to the carbon seal assembly bottom contacting at one circumferential location, the interface between a piston ring face and a spring face may be maintained to acceptable levels, for instance the interface between the piston ring face and the spring face may be no less than 66% coverage. Dimensions of the first step of the carbon seal assembly provide physical fool proofing.

According to various embodiments, a carbon seal assembly is disclosed herein. The carbon seal assembly may include a first step; and a second step or a first groove and a second groove. The carbon seal assembly may be juxtaposed substantially adjacent to a portion of a cylindrical ID bore. A piston ring may be configured to interface with a face of the carbon seal assembly. The piston ring may be cylindrical and substantially surrounds the cylindrical ID bore, and wherein a spring may be configured to interface with a surface of the piston ring.

According to various embodiments, a piston ring is described herein. The piston ring may include a first face configured to form a first seal between the piston ring and a cylindrical ID bore. The piston ring may include a second face configured to form a second seal between the piston ring and a carbon seal assembly. The piston ring may include a third face configured to interface with a surface of a spring. The third face may be longer than the surface of the spring.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Different cross-hatching and/or surface shading may be used throughout the figures to denote different parts but not necessarily to denote the same or different materials.

FIG. 1A schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about an engine central longitudinal axis X relative to an engine static structure 36 via various bearing systems 38. It should be understood that various bearing systems 38 at various locations may alternatively or additionally be provided.

The low speed spool 30 generally includes an inner shaft 40 that connects a fan 42 and a low pressure (or first) compressor 44 section to a low pressure (or first) turbine 46 section. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor 52 section and a high pressure (or second) turbine section 54. The inner shaft 40 and the outer shaft 50 are concentric and rotate via the various bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports various bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density is achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

With reference to Prior Art FIG. 1B a seal assembly, such as a carbon seal housing 110, piston ring 130, spring 140 and cylindrical ID bore 120. A carbon seal housing 110 may comprise a carrier configured to hold a piston ring 130. The piston ring 130 may be a torus, and/or a slotted torus. The piston ring 130 may be configured to create seals. For instance, a fluid-tight seal may be created between a first surface 134 of the piston ring 130 and a first surface 122 of the cylindrical ID bore 120. The piston ring 130 may be configured to seal air from entering a bearing compartment. A fluid-tight seal may be created between a second surface 136 of the piston ring 130 and a first surface 112 of the carbon seal housing 110.

These components may reciprocate axially and/or experience vibration. These components may also experience radial eccentricity which may involve components moving off-center. The size of gap B may increase between the carbon seal housing 110 and the cylindrical ID bore 120, at least with respect with a portion of the carbon seal housing 110, in response with this radial eccentricity and/or vibration. The size of gap A is constant. As the size of gap B increases, spring 140 tends to travel in concert with the carbon seal housing 110. This leads to a first face 142 of spring 140 being off-center with respect to a third face 132 of carbon seal housing 110. Having low values of face coverage may cause wave spring distortion. This could negatively impact the function and performance of the seal assembly and associated engine.

According to various embodiments and with reference to FIGS. 2A-2E, a radial coverage piston ring groove arrangement seal assembly is disclosed. The seal assembly may comprise a carbon seal housing 210, a piston ring 230, spring 240 and cylindrical ID bore 220. The carbon seal housing 210 may comprise a carrier configured to hold a piston ring 230. The piston ring 230 may be a torus, and/or a slotted torus. The piston ring 230 may at least partially circumferentially wrap around a cylindrical ID bore 220. The piston ring 230 may be configured to create seals. For instance, a fluid-tight seal may be created between a first surface 234 of the piston ring 230 and a first surface 222 of the cylindrical ID bore 220. The piston ring 230 may be configured to seal air from entering the bearing compartment. A fluid-tight seal may be created between a second surface 236 of the piston ring 230 and a first surface 212 of the carbon seal housing 210. A portion of the carbon seal housing 210 may circumferentially wrap around both the piston ring 230 and a portion of the cylindrical ID bore 220. Piston ring 230 may be made from any suitable material, such as cast iron, steel, a non-metallic material, carbon graphite and/or the like. Spring 240 may be any spring configured to properly position piston ring 230 within carbon seal housing 210. According to various embodiments, spring 240 may be a wave spring. A wave spring (sometimes referred to as a coiled wave spring or a scrowave spring), is a generally flat cylindrical article of material, similar to a washer, to which waves are added to impart a spring effect. The number of turns and waves can be adjusted to produce a weaker or a stronger force.

Figure 2A:
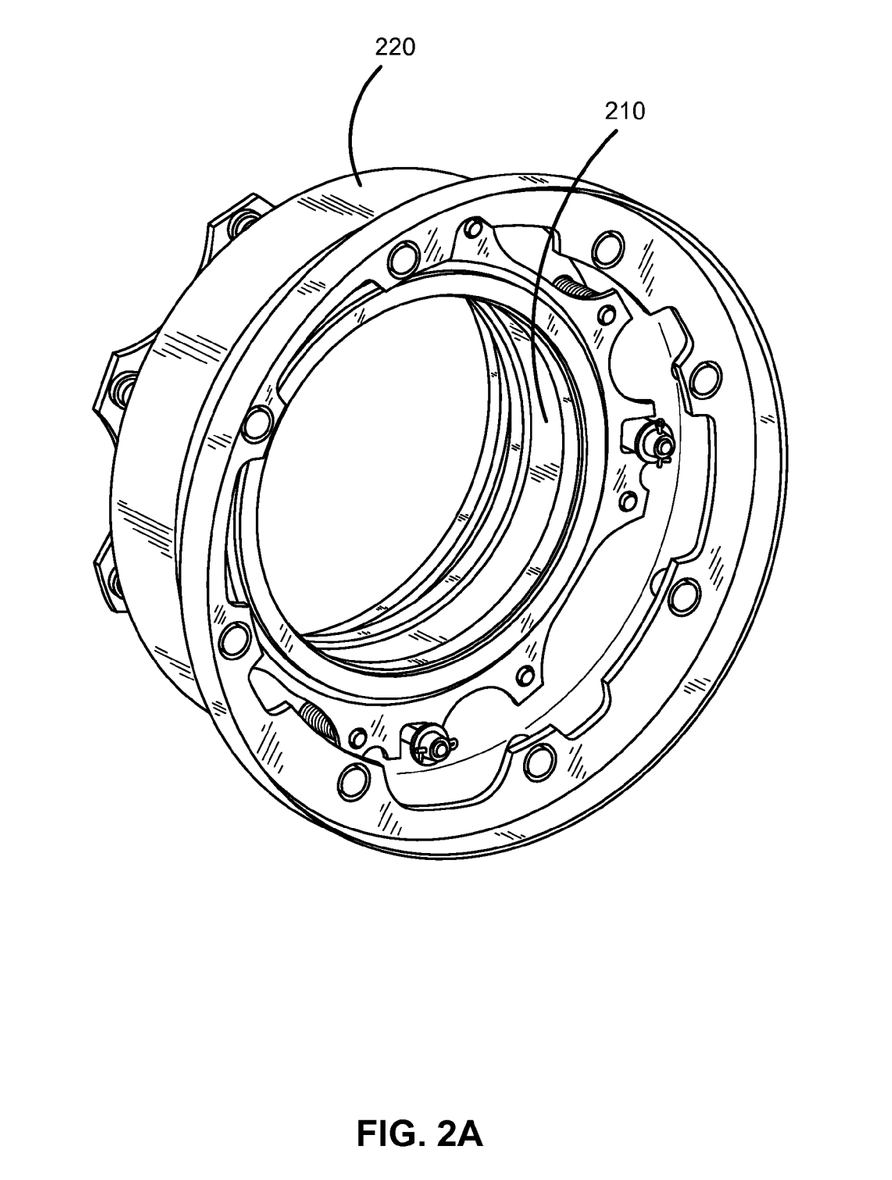
FIGS. 2A-2D depict isometric and isometric cut-away views of an improved radial coverage piston ring groove arrangement in accordance with various embodiments.
Figure 2B:
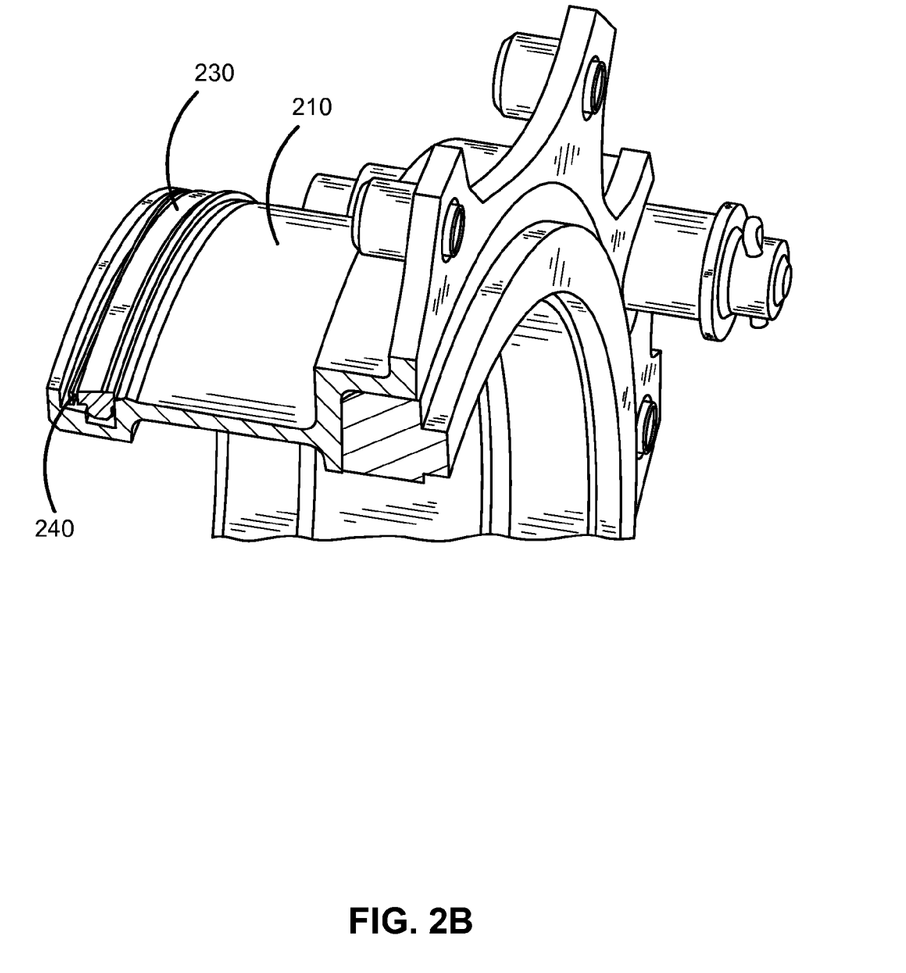
Figure 2C:
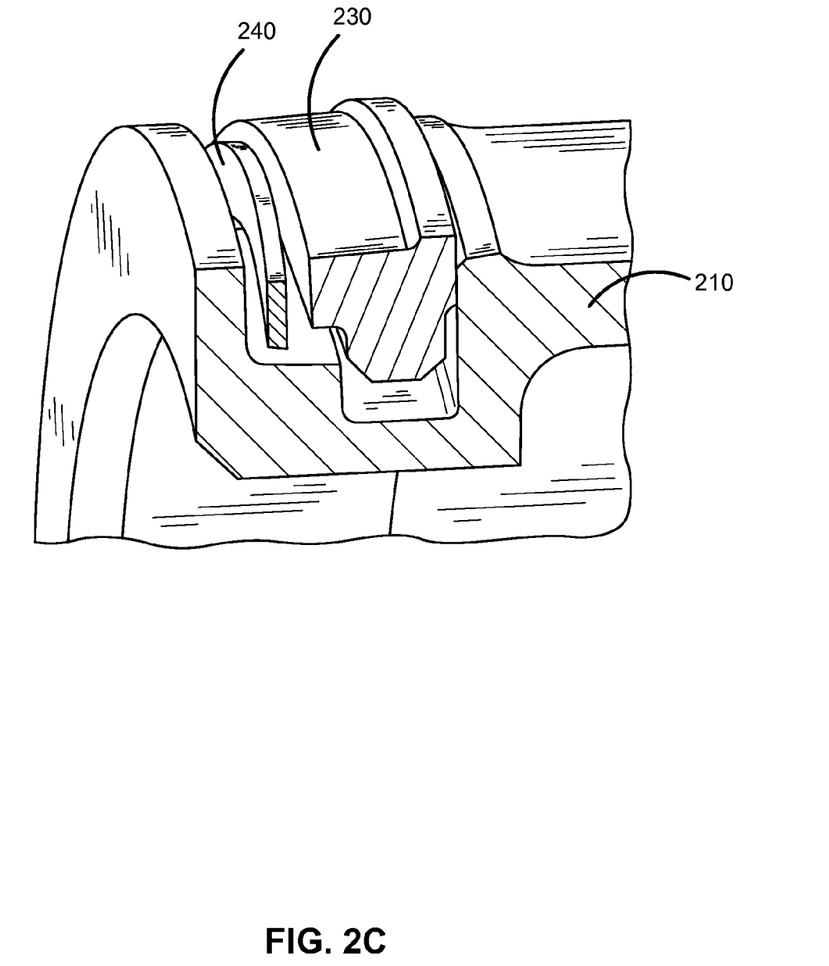
Figure 2D:
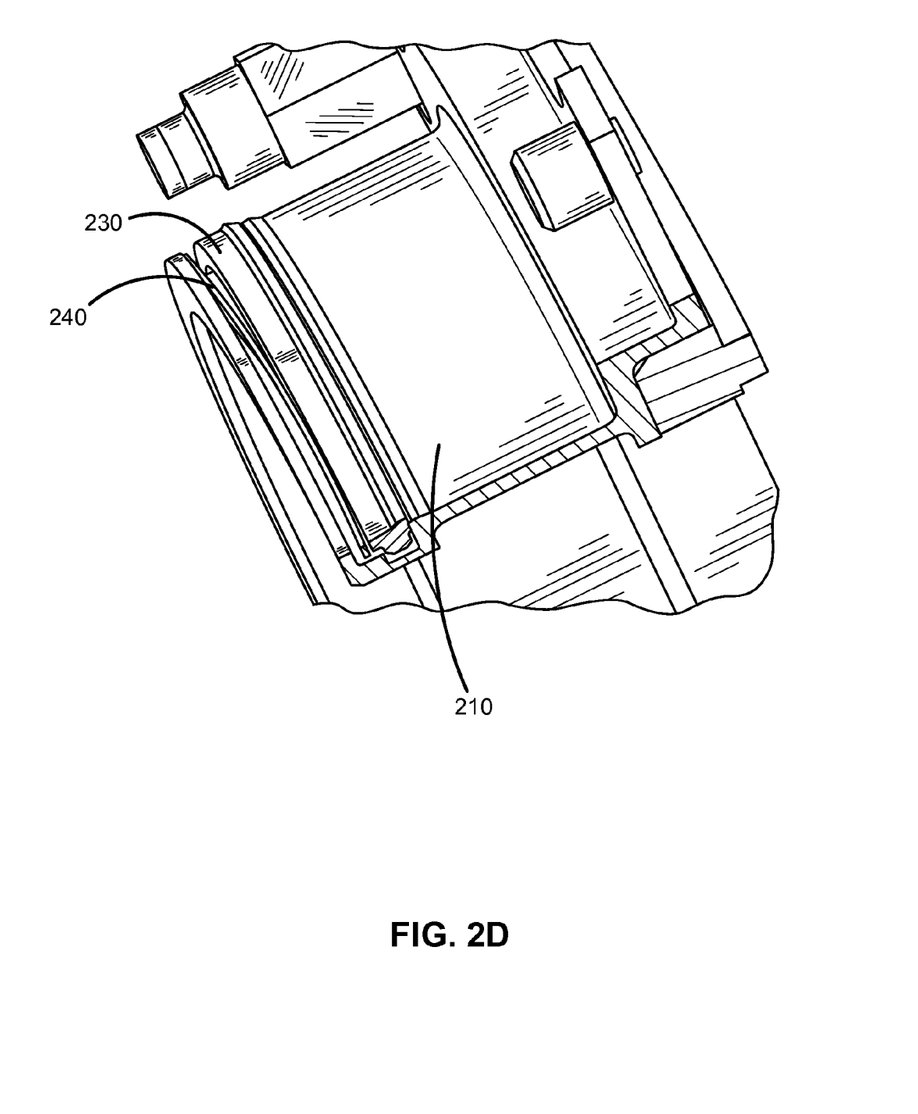
Figure 2E:
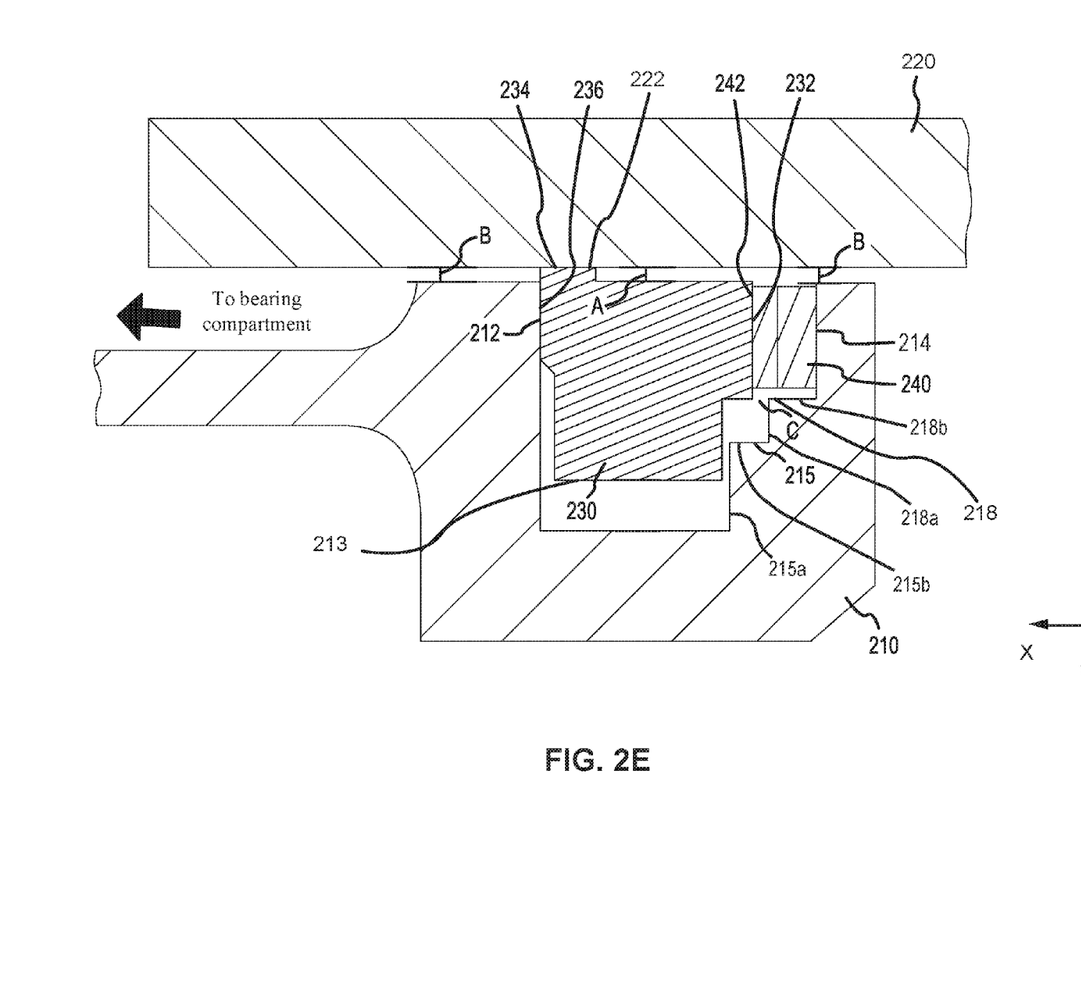
FIG. 2E depicts a cross-sectional cut-away side view of an improved radial coverage piston ring groove arrangement in accordance with various embodiments.

According to various embodiments and reference to FIG. 2E, piston ring 230 may be shaped such that its shape renders it difficult or impossible to install in an incorrect orientation. For instance, first step 215 of carbon seal housing 210 may extend in such as manner as to physically interfere with an OD (bottom) surface 213 of piston ring 230 should piston ring 230 be attempted to be inserted within carbon seal housing 210 backwards. Additionally, should spring 240 be attempted to be inserted contacting second surface 236 rather than third face 232, piston ring 230 will be physically restricted from insertion within carbon seal housing 210 due to interference with first step 215 and/or second step 218. First step 215 may be defined by radial surface (also referred to herein as a third radial surface) 215a and axial surface (also referred to herein as a first axial surface) 215b. Second step 218 may be defined by radial surface (also referred to herein as a fourth radial surface) 218a and axial surface (also referred to herein as a second axial surface) 218b.

According to various embodiments, third face 232 of piston ring 230 may be longer measured from the inner diameter to the outer diameter that the length of spring 240 measured from the inner diameter to the outer diameter. For instance, third face 232 of piston ring 230 may be longer than a first face 242 of spring 240. This may increase coverage and contact between the piston ring 230 and the spring 240, particularly, in response to a scenario where the carbon seal housing 210 has bottom contacted at one circumferential location (see FIG. 3 for an example of the carbon seal housing 210 has bottom contacted at one circumferential location). Third face 232 of piston ring 230 is radially longer than third face 132 of piston ring 130. As illustrated in FIG. 2E, spring 240 may be coupled between third face (also referred to herein as a piston ring face) 232 and radial surface (also referred to herein as a second radial surface) 214 of carbon seal housing 210.

According to various embodiments, second step 218 of the carbon seal housing 210 may be sized such that spring 240 is restricted from entering gap C. Stated another way, a width of the second step is sized to prevent the spring from entering a gap adjacent to the second step formed between the piston ring and the carbon seal assembly. For instance, the width of second step 218 is greater than about half the height of spring 240. Spring 240 is taller, axially, than spring 140 (see axis X-X').

Figure 3:
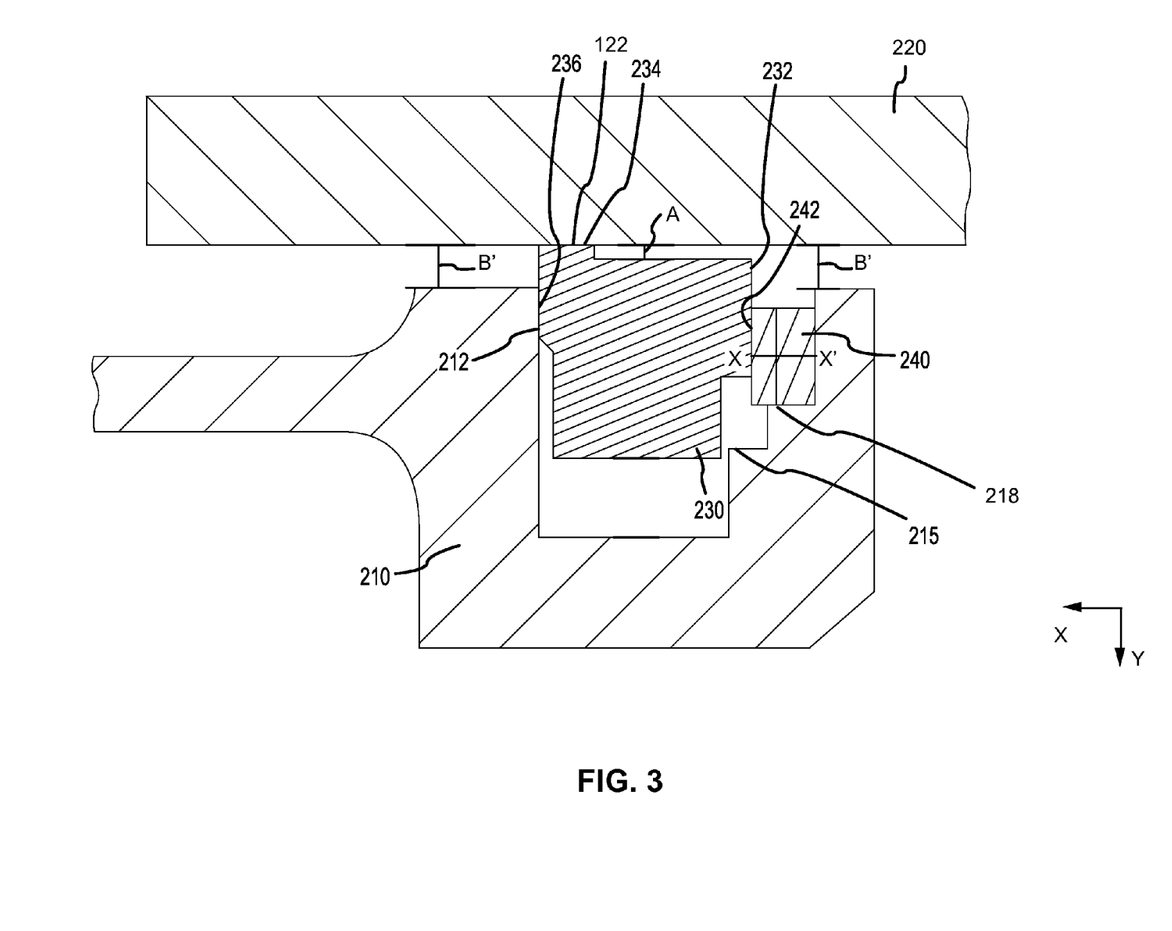
FIG. 3 depicts an improved radial coverage piston ring groove arrangement with a non-centered carbon seal assembly in accordance with various embodiments.

According to various embodiments and with reference to FIG. 3, a scenario where the carbon seal housing 210 has bottom contacted at one circumferential location is depicted. In this way, gap B' is about doubled as compared to gap B as shown in FIG. 2E and gap A is maintained (as a constant size) from its size in FIG. 2E. Spring 240 has traveled away from cylindrical ID bore 220 with the carbon seal housing 210. A high percentage of radial coverage between third face 232 of piston ring 230 and first face of spring 240 may be maintained as compared with conventional methods. For instance, radial coverage between third face 232 of piston ring 230 and first face of spring 240 is no less than about 66% coverage of first face 242 of spring 240.

A modified ring groove geometry that creates 2 distinct cavities or steps 215, 218 for the piston ring 230 and spring 240 is described herein. This concept provides a separate groove cavity for the spring 240 (step 218), independent of the clearance cavity. This modified ring groove geometry increases first face 242 coverage and reduces exposure risk for eccentricity of spring 240 to piston ring 230, to avoid potential disengagement and improve function and performance of the seal assembly and engine. These improvements are achieved while maintaining other design constraints such as resistance to incorrect installation/assembly and desired clearances.

Advanced, high-performance engines would benefit from improved performance main shaft bearing compartment seals while also meeting more aggressive cost, weight, size and reliability metrics. Improved capability main shaft bearing compartment carbon seals tend to meet the increased demands of next generation high-performance engines. Carbon seals enable the engine and bearing compartment to function with minimal impact on Thrust Specific Fuel Consumption (TSFC), the Thermal Management System (TMS) and the Lubrication System. Current and future engine programs would benefit from seals with improved wear.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A main shaft bearing compartment seal system comprising:
   a cylindrical inner diameter (ID) bore;
   a carbon seal assembly juxtaposed substantially adjacent to a portion of the cylindrical ID bore, wherein the carbon seal assembly comprises:
   a carbon seal housing comprising a groove defined by:
      a bottom surface;
      a first radial surface;
      a second radial surface located opposite the groove from the first radial surface;
      a first step defined by a third radial surface and a first axial surface; and
      a second step defined by a fourth radial surface and a second axial surface,
      wherein the second step is disposed radially between the second radial surface and the first step, and the first step is disposed radially between the second step and the bottom surface;
   a piston ring, wherein the piston ring is cylindrical and substantially surrounds the cylindrical ID bore; and
   a spring having a spring face interfacing with a piston ring face of the piston ring, the spring positioning the piston ring within the groove of the carbon seal housing, the spring located only radially outward from the second step and contacting between the second radial surface and the piston ring face,
   wherein the piston ring face is positioned radially between the first step and the portion of the cylindrical ID bore,
   wherein the piston ring face is longer, measured radially, than a radial length of the spring face, and
   a width of the second step is sized to prevent the spring from entering a gap formed between the piston ring and the second step of the carbon seal housing.

2. The main shaft bearing compartment seal system of claim 1, wherein dimensions of the piston ring provide resistance to improper installation.

3. The main shaft bearing compartment seal system of claim 1, wherein the spring is a wave spring.

4. The main shaft bearing compartment seal system of claim 1, wherein in response to the carbon seal housing bottom contacting at one circumferential location, the interface between the piston ring face and the spring face is no less than 66% coverage of the spin face.

5. The main shaft bearing compartment seal system of claim 1, wherein dimensions of the first step of the carbon seal housing provide resistance to improper installation.

6. The main shaft bearing compartment seal system of claim 1, wherein dimensions of the first step of the carbon seal housing provide physical fool proofing.

7. The main shaft bearing compartment seal system of claim 1, wherein a piston ring width, measured axially, of the piston ring is greater than a bottom surface width, measured axially, of bottom surface.

8. A carbon seal assembly comprising:
   an outer element having a bore;
   the carbon seal assembly juxtaposed substantially adjacent to a portion of the bore, wherein the carbon seal assembly comprises:
   a carbon seal housing comprising a groove defined by:
      a bottom surface;
      a first radial surface;
      a second radial surface located opposite the groove from the first radial surface;
      a first step defined by a third radial surface and a first axial surface; and
      a second step defined by a fourth radial surface and a second axial surface,
      wherein the second step is disposed radially between the second radial surface and the first step, and the first step is disposed radially between the second step and the bottom surface;
   a piston ring, wherein the piston ring is cylindrical and substantially surrounds a portion of the bore; and
   a spring having a spring face interfacing with a piston ring face of the piston ring, the spring positioning the piston ring within the groove of the carbon seal housing, the spring located only radially outward from the second step and contacting between the second radial surface and the piston ring face,
   wherein the piston ring face is positioned radially outward from the first step and axially aligned with at least a portion of the first axial surface in an installed position,
   the piston ring face is positioned radially between the first step and the portion of the bore, and
   wherein the piston ring face is longer than the spring face, and
   a width of the second step is sized to prevent the spring from entering a gap formed between the piston ring and the carbon seal housing.

9. The carbon seal assembly of claim 8, wherein dimensions of the piston ring provide resistance to improper installation.

10. The carbon seal assembly of claim 8, wherein the spring is a wave spring.

11. The carbon seal assembly of claim 8, wherein in response to the carbon seal housing bottom contacting at one circumferential location, the interface between the piston ring face and the spring face is no less than 66% coverage of the spring face.

* * * * *

UNITED STATES PATENT AND TRADEMARK OFFICE
CERTIFICATE OF CORRECTION

PATENT NO. : 9,970,549 B2  
APPLICATION NO. : 14/600858  
DATED : May 15, 2018  
INVENTOR(S) : Jonathan Logan Miller Page 1 of 1

It is certified that error appears in the above-identified patent and that said Letters Patent is hereby corrected as shown below:

In the Claims

In Column 7, Line 52 Claim 14 delete "the spin face" and therefore insert -- the spring face --

Signed and Sealed this
Twenty-eighth Day of August, 2018

Andrei Iancu
*Director of the United States Patent and Trademark Office*